T. E. MURRAY, Jr.
PROCESS OF AND APPARATUS FOR ELECTRICALLY MAKING HOLES IN METAL BLOCKS OR PLATES.
APPLICATION FILED APR. 24, 1917.

1,233,689. Patented July 17, 1917.

Inventor
Thomas E. Murray Jr.
By his Attorney

UNITED STATES PATENT OFFICE.

THOMAS E. MURRAY, JR., OF BROOKLYN, NEW YORK.

PROCESS OF AND APPARATUS FOR ELECTRICALLY MAKING HOLES IN METAL BLOCKS OR PLATES.

1,233,689. Specification of Letters Patent. Patented July 17, 1917.

Application filed April 24, 1917. Serial No. 164,131.

*To all whom it may concern:*

Be it known that I, THOMAS E. MURRAY, Jr., a citizen of the United States, residing at Brooklyn, in the county of Kings and State of New York, have invented a certain new and useful Improvement in Processes of and Apparatus for Electrically Making Holes in Metal Blocks or Plates, of which the following is a specification.

The invention is a process and an apparatus for electrically making holes in metal blocks or plates. Said holes may be used for any constructive purpose—as, for example, the insertion of rivets connecting such plates or blocks together.

The principle of my invention depends upon the fact that when the plate or block to be pierced is placed upon an electrode having an opening corresponding in area and configuration to the desired hole, and a second electrode adapted to enter said opening and disposed in front thereof is brought into contact with the metal of the portion of the plate which covers said opening, said metal will be fused by the current and will flow through the opening, leaving a hole through the plate. The entrance of the second electrode into the opening assists and accelerates the flow, and also by reason of its sliding contact with the more or less plastic metal bounding the hole, shapes the same.

In the accompanying drawings—

Figure 1:
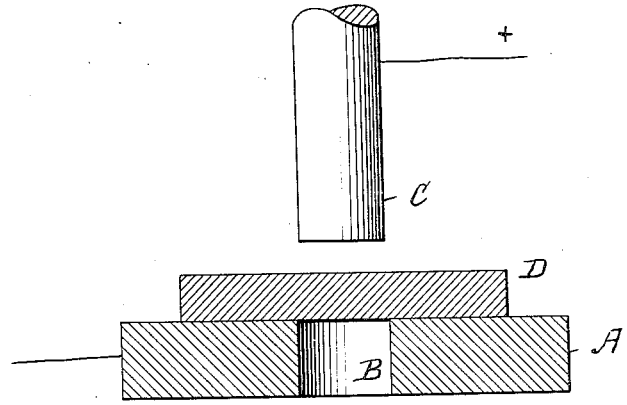
Figure 2:
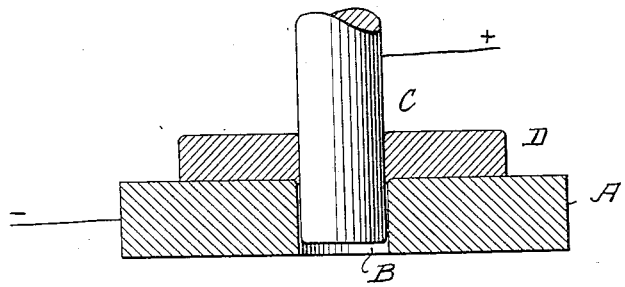
Figure 3:
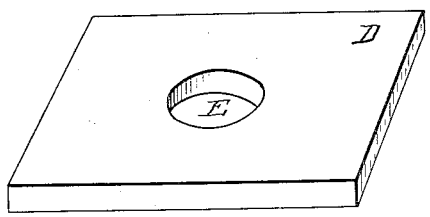

Figure 1 is a vertical section through the fixed electrode and plate to be pierced, showing the movable electrode in elevation and raised. Fig. 2 is a similar view, showing the movable electrode in the opening in the fixed electrode after pushing out the melted metal. Fig. 3 is a perspective view of a plate of metal with the hole made therein.

Similar letters of reference indicate like parts.

The fixed electrode A is a plate or block of metal, having an opening B of predetermined cross sectional area and configuration—said configuration being here shown as circular. The movable electrode C is supported in any suitable way for vertical movement above the opening B, and is adapted to enter said opening with small clearance. The plate D, in which the hole is to be made, is placed upon the electrode A to cover opening B. The electrode C is then caused to descend. When said electrode C meets the plate D, current is established through the portion of said plate which covers the opening B and is in front of the end of electrode C. Said current is to be of sufficient strength to melt the metal of said portion of said plate, so that said melted metal will flow through the opening B, thus producing a hole E through the plate—the cross sectional area and shape of which hole will correspond substantially to that of the opening B. As the electrode A moves into said opening, it pushes said melted metal before it, and also shapes said opening by reason of its sliding contact with the more or less plastic metal surrounding said opening. After the hole is made, I may increase its area by reaming or any suitable enlarging process.

While I have here shown the hole B as circular, and the electrode A accordingly cylindrical, it is to be understood that I do not limit myself to this configuration, since holes that are square, triangular, or of other shape, may be made by the same method and similar means.

I claim:

1. Making an opening in a metal block or plate by electrically heating a predetermined portion thereof to melt said portion and so cause the same to flow away from the remainder of the plate.

2. Making an opening in a metal block or plate, as in claim 1, the said melted portion being subjected to pressure to cause the same to flow away from the remainder of the plate.

3. Making a hole in a metal block or plate by placing said plate between an electrode having an opening and an electrode disposed in front of, and at its end of less area than, said opening, and establishing a current through said plate and electrodes, whereby the metal of said plate in contact with said last-named electrode is melted and caused to flow through said opening.

4. Making a hole in a metal block or plate by subjecting said plate, while supported upon an electrode having an opening, to the pressure of a second and movable electrode disposed in front of and entering said opening, whereby upon the establishment of current through said electrodes the metal of said plate between said opening and said movable electrode is melted and pushed through said opening.

5. An apparatus for electrically making a hole in a metal plate, comprising an electrode having an opening which in area and shape substantially corresponds to the area and shape of the desired hole, and an electrode of cross sectional area and shape adapted to enter said opening, one of said electrodes being movable with respect to the other to establish circuit through said electrodes and the said plate when interposed between them.

6. An apparatus for electrically making a hole in a metal plate, comprising an electrode having an opening which in area and shape substantially corresponds to the area and shape of the desired hole, and an electrode of cross sectional area and shape adapted to enter said opening, one of said electrodes being movable with respect to the other to establish circuit through said electrodes and the said plate when interposed between them, and to cause the passage of said last-named electrode into said opening and through said plate.

In testimony whereof I have affixed my signature in presence of two witnesses.

THOMAS E. MURRAY, JR.

Witnesses:
GERTRUDE T. PORTER,
MAY T. MCGARRY.